Dec. 15, 1964  W. J. PETTER ET AL  3,161,591
FILTERING APPARATUS FOR LIQUID MATERIALS
Filed March 2, 1961
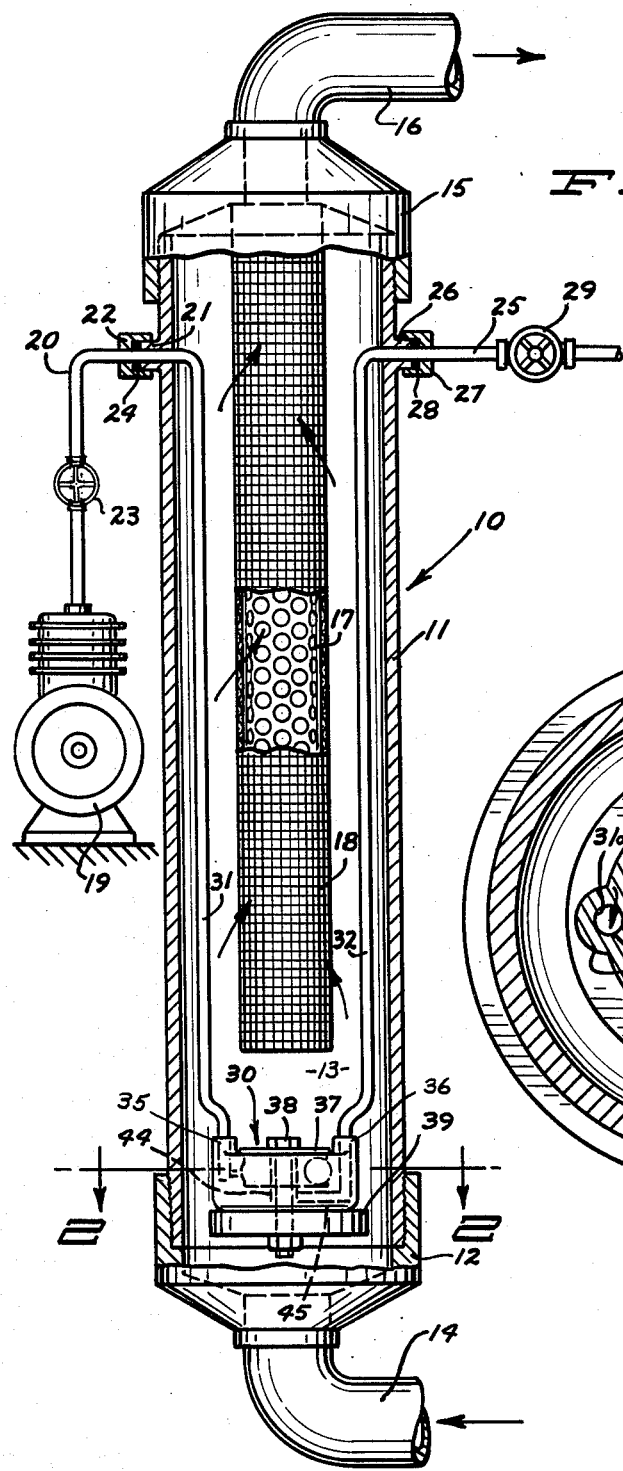
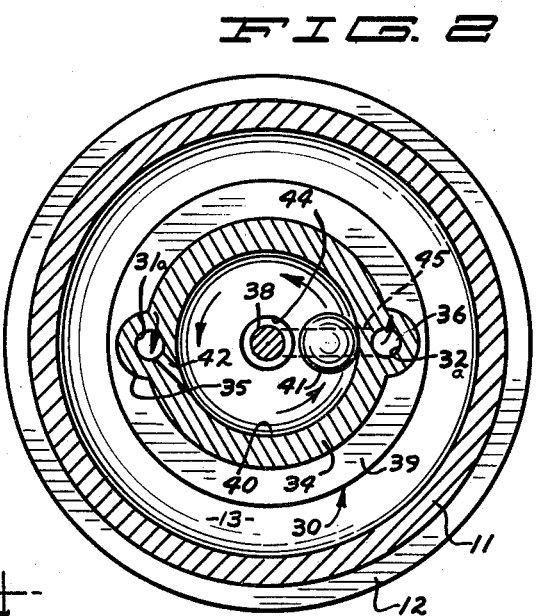
INVENTORS
ROBERT M. RONNINGEN
HELMER A. RONNINGEN
BY WILLIAM J. PETTER
Carlsen & Carlsen
ATTORNEYS

United States Patent Office 3,161,591
Patented Dec. 15, 1964

3,161,591
FILTERING APPARATUS FOR LIQUID MATERIALS
William J. Petter, Robert M. Ronningen, and Helmer A. Ronningen, Vicksburg, Mich., assignors to Ronningen-Petter Company, Kalamazoo, Mich., a corporation of Michigan
Filed Mar. 2, 1961, Ser. No. 92,898
4 Claims. (Cl. 210—251)

This invention relates generally to the filtration of liquids and more particularly to the filtering of liquid solutions, suspensions and the like having a high solids content.

In certain liquids of a viscous or thixotropic nature or otherwise having a high solids content such as colloidal gels, lime and clay slurries, starch solutions, clay coatings and the like, the solids tend to coagulate or coalesce because of their colloidal nature. This renders filtration of large particles of impurity from such liquids a difficult problem. Vibration of materials of this type tends to retain them in their most highly fluid state as set forth more specifically in United States Patent No. 2,732,949, dated January 31, 1956.

The primary object of the present invention is to provide an apparatus for filtering liquid materials having a relatively high solids content with a new and improved means for maintaining the material in a condition of maximum fluidity during filtration.

Another and more specific object of the invention is to provide a filtering apparatus having a filter enclosed in a casing adapted to be connected in a liquid line, and having means for transferring vibrations to liquid in the casing without imparting such vibrations to the casing or line.

Still another object of the invention is to provide a filtering apparatus for liquid materials having a heavy solids content with a pneumatically operated means for conveying vibrations to the liquid in the apparatus during the filtering operation.

Still another object of the invention is to provide a liquid filtering apparatus with a vibrator powered by fluid pressure for vibrating the liquid and wherein the fluid supply lines for the vibrator also serve to convey the vibrations to the liquid in the apparatus.

Another object of the invention is to provide a filtering apparatus having a liquid casing and a vibrator suspended for movement within the casing and having means protecting the vibrator during its movement from engagement with the casing.

With the above mentioned objects in view the invention broadly comprises the positioning of a pressurized fluid operated vibrator in the liquid chamber of a filtering apparatus adapted to convey vibrations to the liquid in the chamber to increase its fluidity as it passes through the filter. The vibrator is suspended by its fluid supply lines which also serve to transmit vibrations to the liquid.

The above mentioned and additional objects of the invention will be brought to light during the course of the following specification, reference being made to the accompanying drawing, in which—

FIG. 1 is a vertical section taken through the casing of a filtering apparatus embodying the present invention and showing the vibrating mechanism in elevation. The filter screen is partially broken away to show the perforate backing tube therefor.

FIG. 2 is an enlarged horizontal section taken along line 2—2 of FIG. 1.

Referring now more particularly to the drawing, reference characters will be used to denote like parts or structural features in the different views. The filtering apparatus is denoted generally at 10. The filter itself is of conventional construction with an outer casing formed of a body tube 11 having a bottom casing 12 threaded thereon and providing a connection with a liquid inlet pipe 14. At its upper end the tube 11 is capped by a casting 15 which provides a connection with outlet pipe 16. A tubular filter element 17 has its upper end connected to casting 15 in open connection with line 16. This element is formed of perforate sheet metal material and serves as a backing for a covering of filter screen 18. The filter 17 and its covering 18 are significantly smaller in diameter than the interior of tube 11 and terminate in their downward extension a substantial distance above the casting 12 so as to leave a relatively large liquid chamber 13 within the tube 11 peripherally surrounding and extending below the filter.

Filters of the general type thus far described are in common use. They may be used in groups dependent upon the desired capacity of the filtering system. The filters are also conventionally provided with necessary pressure gauges, valves and controls for backwashing the filter screen, etc., none of which components form a necessary part of the present invention. It is only essential to understand here that the relatively heavy or viscous liquid to be filtered passes through line 14 into chamber 13 which surrounds the filter element 17, then into the element 17 through its screen covering 18 and out the line 16.

The present invention is to enable this type of filter to be used effectively for viscous fluids, colloidal gels, clay slurries, starch coatings and the like by subjecting the material to high frequency vibration or agitation to maintain them as fluid as possible as they pass through the filter screen.

The numeral 19 denotes a power driven pump adapted to deliver air under pressure into line 20. An air inlet nipple 21 is provided on one side of the body tube 11 near the upper end thereof. Line 20 extends through nipple 21 and a liquid tight seal is provided around the line by cap 22 and seal 24. Diametrically opposed to nipple 21 an air outlet line 25 passes through nipple 26 provided on the body tube and the nipple is sealed by a cap 27 and seal 28. A valve 29 is provided in line 25 for opening and closing the passage therethrough.

The vibrator designated generally at 30 is disposed in the bottom portion of the chamber 13 below the filter 17. The vibrator is suspended within the chamber in spaced relation from filter 17, tube 11, and casting 12 by means of air lines 31 and 32 which respectively extend from inlet nipple 21 to boss 35 on vibrator housing 34 having an inlet port 31ª and from outlet nipple 26 to a boss 36 on said housing having an outlet port 32ª. The lines 31 and 32 are suitably connected to the bosses and are formed of semi-flexible material such as heavy rubber to allow vibrating movement of the vibrator 30.

The housing 34 is cup shaped with the open top thereof covered by a cap 37 which is held in place by bolt and nut assembly 38 which extends downwardly through the cap, a center aperture in the housing 34 and a disk 39 which is held against the bottom of the housing. The housing has an annular side wall which forms an internal raceway 40 for ball 41 disposed within the housing. An air inlet passage 42 extending substantially tangential to the raceway connects the inlet port 31ª with the housing interior. The center aperture in the housing through which bolt 38 extends is substantially larger in diameter than the bolt leaving an annular passage around the bolt which is connected by radial passage 45 with the outlet port 32ª in the casting.

As air or other fluid is pumped under pressure from compressor 19 through line 31, port 31ª, and passage 42 into the interior of the housing it will cause ball 41 to travel about the raceway 40 in the direction indicated, vibrating the entire housing in a well known manner. The air leaves the housing through passages 44 and 45, port 32ᵃ and outlet line 32, 25. The pressure in the system and consequently the vibration thereof are controlled by valve 23 disposed in line 20 and valve 29 which regulates the flow of air through the vibrator.

The disk element 39 appended to the housing 34 is optional. This element serves to increase the surface area of the vibrating mechanism and may take various shapes or sizes and be formed of hard rubber or of any one of numerous nonsaturable materials adapted to carry out the intended function of the element. The disk also serves to center the vibrator within the tube 11 and protect it against contact with the tube.

With the vibrator being suspended by lines 31 and 32 the vibrations will obviously be carried by these lines to convey the vibrations to liquid in chamber 13 throughout substantially the entire depth thereof. These lines thus function to carry the vibrator fluid, suspend the vibrator in the desired position, and transmit the vibrations therefrom. It may be found desirable to provide the vibrator 30 with an exterior cover of thin rubber to prohibit corrosion thereof.

The apparatus can be mounted directly in the pressure system of the material to be filtered. However, it may also be used where the material is fed by gravity into the unit.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A filtering apparatus for use in a fluid line carrying liquids of the character described under pressure, said line having vertically spaced upper and lower fluid conduits, a casing having a top outlet closure member and a bottom inlet closure member each of which is provided with an aperture, means for respectively connecting the top and bottom closure members to said upper and lower fluid conduits through said apertures in sealing relationship whereby the casing and closure members jointly provide a closed fluid connection for carrying fluid upwardly between said conduits, an enclosed perforate filtering element disposed within the casing and having an open connection with the upper conduit leaving a liquid chamber within the casing surrounding and extending below the element, an air operated vibrator disposed in the chamber over the bottom inlet closure member and below the element and spaced therefrom, and air lines extending through a wall of the casing for carrying air to and from the vibrator.

2. The subject matter of claim 1 wherein said air lines are flexible lines connected to opposite sides of said vibrator to suspend the vibrator within the casing in spaced relation to the walls thereof by means of said conduit means.

3. A filtering apparatus for inclusion in a pressure system carrying heavy viscous material through a line having vertically spaced upper and lower fluid conduits, an upright cylindrical casing top and bottom closure members on the casing each having an opening therein, means for respectively connecting said upper and lower fluid conduits to said top and bottom closure members through said openings in sealing relationship, a tubular filter element having a cylindrical wall of perforate material, said filter element disposed concentrically within the casing with its upper end connected to said upper conduit, the filter element having a substantially smaller diameter than the interior of the casing leaving an annular space around the element and being substantially shorter than the casing leaving a cylindrical space below the element, a pneumatic vibrator disposed in said cylindrical space in substantial axial alignment with the filter element, the casing having diametrically opposed openings near its upper end, and a pair of air lines having their upper ends respectively connected one to each of said opposed openings, said air lines extending downwardly through said annular space in diametrically opposing relation and having their lower ends connected to the pneumatic vibrator to respectively carry air to and from the vibrator for agitation of material carried under pressure into the casing through the bottom closure member opening as the material moves upwardly toward the filter element.

4. The subject matter of claim 3 wherein said air lines are flexible and of such a length as to suspend the vibrator in said cylindrical space free from contact with either the filter element or the casing whereby vibrations from the vibrator will be carried through said air lines and imparted uniformly at any level to the viscous material as it rises in the casing from the bottom closure member toward the top closure member.

References Cited in the file of this patent

UNITED STATES PATENTS

| | | |
|---|---|---|
| 616,033 | Sturcke | Dec. 13, 1898 |
| 2,027,681 | Durant et al. | Jan. 14, 1936 |
| 2,187,088 | Malan | Jan. 16, 1940 |
| 2,528,319 | Peterson | Oct. 31, 1950 |
| 2,659,223 | Karcher | Nov. 17, 1953 |
| 2,732,949 | Ziegenbusch | Jan. 31, 1956 |
| 2,902,160 | Anderson | Sept. 1, 1959 |